March 2, 1965 F. MÜLLER 3,171,387
COMBINED ROOM HEATING AND WARM WATER PREPARING APPARATUS
Filed Feb. 26, 1957
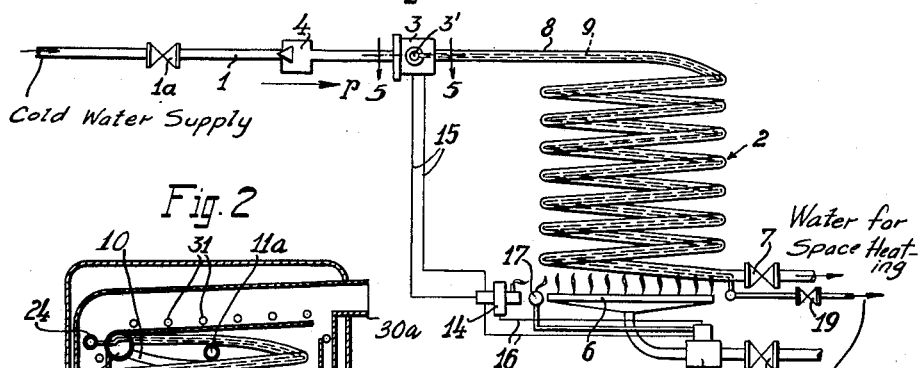
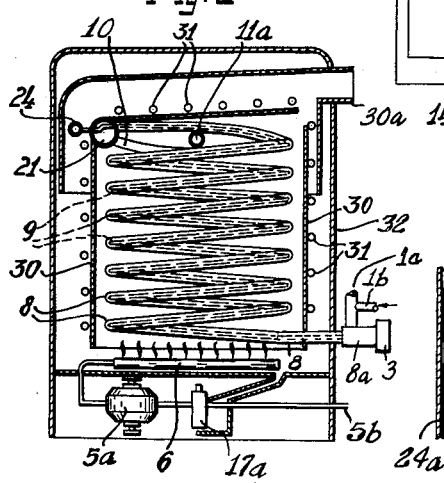
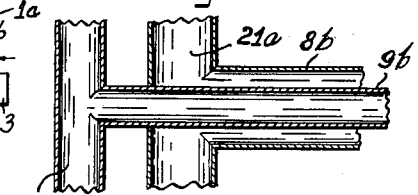
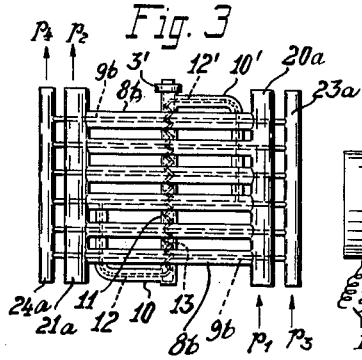
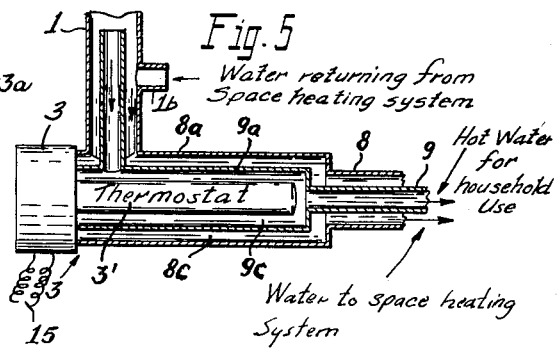
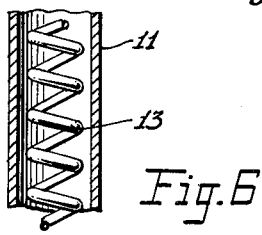

United States Patent Office 3,171,387
Patented Mar. 2, 1965

3,171,387
COMBINED ROOM HEATING AND WARM WATER
PREPARING APPARATUS
Friedrich Müller, Helmgasse 3, Vienna, Austria
Filed Feb. 26, 1957, Ser. No. 642,588
12 Claims. (Cl. 122—33)

This invention relates to a heating system or apparatus for homes, factories, theaters, schools, and other buildings.

It is the principal purpose of the invention to provide a heating plant or apparatus supplying a hot water circulatory system and also, warm or hot water for use in the kitchen or bath.

Another object is to provide a heating system of the type aforesaid which is equally useful and efficient for supplying warm or hot water for consumption during warm or hot weather when no household heating is required.

A still further object is to provide a heating-hot water system which is relatively simple to construct but, at the same time, highly versatile in use.

Yet another object is to provide a heating-hot water system which is efficient in the extraction of heat from combustion and flue gases, both when used for heating and hot water, during cold weather, as well as in the production of hot water during warm seasons of the year.

Another object is to provide a simplified, efficient, water tube heating system which is controlled by a single thermostat for both heating and household water.

The essential feature of the invention consists in that the tubes or coils for heating warm water for household use are coaxially arranged in the tubes or coils for preparing hot water for household heating.

The essential advantage of the invention resides mainly in that in this arrangement the coils through which heating water is supplied are directly exposed to the combustion gases throughout the length of their flow path. Therefore, the tubes or coil for preparing warm water for household use are surrounded only by a minimum volume of hot water so that the warm water coils or tubes are also in efficient heat exchange relation with combustion gases. For this reason it is possible even in summer when hot water is not needed for room heating, to operate the warm water supply system in an energy-saving manner by the same furnace, which is gas-fired, and to control both in the simplest manner, as will be shown hereinafter.

Another feature of the invention, relating to the control, resides in that an adjustable thermostat known per se is inserted at the cold water inlet after the non-return valve in a double-walled enlargement of the supply line. The inner part of the double-walled chamber is connected to the warm water supply system and the outer part is connected to the hot water heating system for room heating whereas the temperature feeler acts on the control valve of the furnace.

By such a construction both parts of the apparatus are thermally combined but provide separate flow paths, and can be controlled jointly by the thermostat, which effects a joint control for both parts while enabling different discharge rates.

These and other effects of the invention will be explained more fully hereinafter with reference to the accompanying drawing, which shows an exemplary embodiment of the invention, In the drawing:

FIGURE 1 is a simplified diagrammatic view of one embodiment of the invention, wherein all jacketing has been omitted for clarity of illustration;

FIGURE 2 is a view of a modification, wherein the coil element per se, is essentially the same as in the species of FIGURE 1, and showing in cross-section the jacketing and feed water economizer;

FIGURE 3 is a modification operating essentially upon the same principle as the species of FIGURES 1 and 2, but showing a plurality of coaxial tube elements connected between headers;

FIGURE 4 is an enlarged detail sectional view of FIGURE 3 showing two adjacent headers and the coaxial tubes connected with the respective headers;

FIGURE 5 is an enlarged detail view, partly in section on line 5—5 of FIGURE 1, showing the connection and association between the water supply, the thermostat, and the coaxial heating and hot water supply heat exchange coils or tubes, and FIGURE 6 is a detail view to an enlarged scale, partly in section, showing a portion of the species of the central vertical external tube and the helical coil contained therewithin, of FIGURE 3.

Referring in detail to the drawing, and in particular to FIGURE 1, 1 identifies the supply pipe through which water flows in the direction of arrow "p" and includes shut-off valve 1a, non-return valve 4, and a thermostat 3' carried at one end by a housing or chamber 3, as fully shown upon FIG. 5. From this FIG. 5 it is noted that thermostat 3' is positioned within, and surrounded by, jacket 9a defining a first chamber 9c. This chamber is in communication at one end, with water supply 1 and at its other end with heating coil or pipe 9 which supplies hot water for household or personal use. A second jacket 8a surrounds jacket 9a to define a second coaxial chamber 8c in communication at one end with water supply 1 and at the other end with coil or supply pipe 8 connected with the space-heating system of the house, for example, and which, as shown, surrounds coil or pipe 9 in coaxial relation therewith. Housing 3 is disposed to close the contiguous ends of jackets 8a and 9a.

While jacket 8a is, as shown, connected with cold water supply pipe 1, it will be understood that this is for the purpose only of supplying a relatively small amount of make-up water to the space-heating system, such as that lost by leakage, evaporation, etc., and that the main portion of the water entering chamber 8c is water returning through pipe 1b from the space-heating system or radiator.

Reverting to FIG. 1, thermostat 3' is connected by an electrical line 15 to a relay 14 which, in turn, is connected by electrical line 16 to solenoid control valve 5 for the gas supply to burner 6. This burner includes pilot 17. A shut-off valve 18 is in the fuel supply line to the burner.

It will be noted that the heat exchange coil 2 consists of a helix formed from an inner hot water coil 9 having an outlet valve 19 and surrounded by a heating water coil 8 in coaxial relation therewith and having an outlet control valve 7.

FIGURE 2 shows a heater having a helical heat exchange coil consisting of outer and inner coaxial pipes 8 and 9, as in FIGURE 1. An inner jacket 30 surrounds the coil and is open at its base for admission of combustion gases from burner 6, supplied by a control valve 5a which may be of the solenoid type supplied over a pipe 5b which also supplies pilot light 17a. Inner jacket 30 connects at its top with an exhaust flue 30a which passes through an opening in an outer jacket 32 coaxial with and spaced from inner jacket 30. Water returning from the space heating system enters from a pipe or header 1b connected with the lower end of coil 8 and is withdrawn from a pipe or header 21, connected with the upper end of the same coil or helix. Likewise, water for household use is supplied to inner coil 9 through a pipe or header 1a, and withdrawn from a pipe or header 24 at the upper end of the coil. An economizer coil or pipes 31 surround inner jacket 30 so that water before entering coils 8 and 9 as aforesaid, may be pre-heated to a certain degree by conduction from the jacket, thus conserving heat which would otherwise be wasted up the stack.

FIGURE 3 shows a second modification comprising a first pair of headers 20a and 21a interconnected by spaced parallel tubes 8b for heating water, and a second pair of headers 23a and 24a interconnected by spaced parallel tubes 9b for heating water for household use. As in the case of the species of FIGURES 1 and 2, and as shown to an enlarged scale upon FIGURE 4, each tube 9b extends from header 24a, for example, through the wall of header 21a and then through tube 8b to the other header 23a, where the construction is identical with the one shown upon FIGURE 4. The inlet and exhaust flow of heating water is indicated by arrows p1 and p2, respectively. The inlet and exhaust flow of household water is indicated by arrows p3 and p4, respectively.

Still referring to FIGURE 3, thermostat 3' is inserted in a tube 11 which extends parallel with and between the headers 20a, 23a on the one side, and headers 21a, 24a on the other side. One of the centrally-positioned tubes 8b communicates at its ends with tube sections 10 and 10'. The other end of section 10' connects with the top of tube 11 while the remaining end of section 10 connects with the bottom of tube 11. Likewise, tube 9b within the aforesaid tube 8b has tube sections 12 and 12' extending along and within tube sections 10 and 10', respectively. A helically wound coil 13, FIGURE 6, is positioned within tube 11. One end of tube section 12 connects with the bottom end of coil 13 and at its other end with that tube 9b which is within the tube 8b connected with tube section 10. Likewise, one end of tube section 12' connects with the top end of coil 13 and its other end with the remaining end of the tube 9b just mentioned. It will be understood that the embodiment of FIGURE 3 is provided with jacketing such as 30, FIGURE 2, with coil 31.

The operation of the thermostat 3' in connection with the control means of the gas-fired furnace is as follows.

For summer operation the thermostat is set to about 20 deg. C. Since the room heating system is out of use in summer of course, water having a room temperature of about 20 deg. C. will be in the space 8b between the tube 9 and the tube 8.

When valve 19, FIG. 1, is opened for drawing warm water, cold water having a temperature of about 10 deg. C. will flow from the supply source 1 into the space 9b and through the same and through the tube 9 to the tap point. Being set to 20 deg. C. the thermostat will respond to the temperature drop by causing the automatic system 14 to open the control valve 5, whereby gas flows out of the burner and is ignited by the pilot flame. After a short time warm water is heated by the rising combustion gases and can be drawn from valve 19. When hot water outlet valve 19 is closed the rising temperature of water about the thermostat will cause the closing of control valve 5.

Exactly the same takes place during the winter operation of the apparatus when room heating is effected by water circulating through the tubes or coil 8. In that case the thermostat 3' is set to 50–60 deg. C.

According to the invention the coaxial coils for preparing hot water and for preparing warm water are disposed adjacent to the greatest heat of radiation and of the greatest heat of combustion gases from the furnace. Moreover, the cooling water system of the jacketed wall 30 may be included in the inflow system of the hot water preparing apparatus. The corresponding connections are not shown on FIGURES 1 and 3 to avoid an undue complication of the drawing.

I claim:

1. In a combined hot water supply and space heating system, first and second coaxially arranged radially-spaced inner and outer tube sections having connection at their first contiguous ends with a common source of water supply, a first header at the second end of said outer tube section connecting the same with space heating means, a second header connected with the second end of said inner tube section and from which hot water is drawn for household use, and a connection to the first end of said second tube for the return thereto of water from said space heating means and the recirculation thereof through said second tube, said inner tube section passing through the wall of said first header for connection with said second header.

2. In a combined hot water supply and space heating system, first and second substantially coextensive heater tubes, said second tube being positioned within and in radially-spaced, coaxial relation with respect to said first tube, connections for supplying feed water from a common source to both said tubes at their first contiguous ends, first conduit means for connecting the other end of said first tube with a space heater, second conduit means for connecting the other end of said second tube with a hot water distribution system and a connection at the first end of said outer tube through which space heating water is returned to and for recirculation through, said outer tube, said inner tube section passing through the wall of said first header for connection with said second header.

3. In a combined hot water supply and space heating system, first and second, coextensive, coaxially-disposed radially-spaced inner and outer tubes, means connected with both said tubes at their first ends, to supply water thereto, a thermostat at said first ends in heat exchange relation with water in said first tube only, a burner positioned beneath said tubes to supply heat thereto, fuel supply connections with said burner including a control valve, connections between said thermostat and control valve, and connections at the second ends of said first and second tubes to supply hot water and space heating water, respectively, and a connection at the first end of said outer tube through which space heating water is returned to said outer tube for recirculation therethrough.

4. In a combined space heating and hot water supply system, first casing means forming an inner chamber, second casing means forming a second chamber enclosing and spaced about said first chamber, a thermostat in said first chamber, tube means connected with and supplying feed water to both said chambers from a common source, a first hot water heating tube in communication with and leading from said first chamber, a second tube for space heating water in communication with and leading from said second chamber, said first tube being fixed within said second tube in radially-spaced relation therewith, a connection to said tube means, returning space heating water for recirculation through said second tube, a burner associated with said tubes to supply heat thereto, and control means between said thermostat and said burner.

5. In a combined hot water apparatus for space heating and household use, a first helical coil, a second helical coil positioned inside said first coil and extending therealong in coextensive spaced relation, conduit means supplying feed water from a common source to said coils at one end thereof, means connecting the other end of said first coil to a space heater, means connecting the other end of said second coil to hot water conduits, a burner in heating relation with said coils, a fuel supply conduit to said burner and including a shut-off valve, a thermostat in heat exchange relation with water entering said second coil, control connections between said thermostat and said valve, and a connection to said first helical coil at said one end thereof from the space heating system to return water therefrom for recirculation through said first helical coil.

6. In a combined hot water and space heating apparatus, a first pair of spaced headers, a second pair of spaced headers, a first plurality of heat exchange tubes each having its ends in communication with respectives ones of said first pair of headers, and a second plurality of heat exchange tubes each having its ends in communication with respective ones of said second pair of headers, each said second tube being positioned inside and in radially-spaced relation with respect to a corresponding one of said first plurality of tubes.

7. An apparatus as in claim 6, a thermostat tube having a discrete helical tubular coil therewithin, first tube means connecting respective ends of one of said first plurality of tubes with corresponding ends of said thermostat tube, second tube means connecting the ends of said tubular coil with respective ends of that one of said second heat exchange tubes within said one of said first plurality of tubes, and a thermostat mounted in said thermostat tube.

8. An apparatus as in claim 6, each of said second pair of headers being outside of and adjacent a respective one of said first pair of headers, each of said second plurality of tubes passing through an aperture in said first pair of headers, in pressure-tight relation therewith.

9. In a combined hot water supply and space heating system, first and second tubes, said second tube being positioned bodily within said first tube in radially-spaced relation therewith to define discrete water containing spaces within said second tube and between said tubes, respectively, conduit means supplying make-up water to both said tubes at their entrance ends, means for connecting the delivery end of said first tube to a space-heater, means for connecting the delivery end of said second tube to a hot water dispenser, a thermostat responsive only to the temperature of make-up water entering said second tube, heater means supplying heat to the exterior of said first tube only, control means between said thermostat and said heater means, and means for connecting said entrance end of said first tube with a return line from the space heating system, to return water from said system for recirculation through said first tube.

10. A system as in claim 9, water in said second tube being heated only by conduction through water in the space between said tubes.

11. A system as in claim 9, said first and second tubes being in the form of a helical coil.

12. In a system for supplying hot water for space heating and household use, a first housing, a second housing within said first housing, a thermostat within said second housing, a first heating tube, a second heating tube positioned inside said first tube and extending therealong in coextensive radially-spaced relation, conduit means supplying make-up water to said first and second housings, one end of said first heating tube being in communication with said first housing only, one end of said second heating tube being in communication with said second housing only, fuel-consuming heater means in heat exchange relation with said first heating tube, control connections between said thermostat and said heater means, the other ends of said first and second tubes being connected with space-heating radiator means and hot-water supply means, respectively, and a connection with said conduit means to return space heating water to said first heating tube for recirculation therethrough.

References Cited in the file of this patent

UNITED STATES PATENTS

| | | |
|---|---|---|
| 169,747 | Kannel et al. | Nov. 9, 1875 |
| 234,645 | Allington | Nov. 23, 1880 |
| 388,772 | Gold | Aug. 28, 1888 |
| 557,265 | Gold | Mar. 31, 1896 |
| 1,235,508 | Taylor | July 31, 1917 |
| 1,465,109 | Boggs | Aug. 14, 1923 |
| 2,011,506 | Starkweather | Aug. 13, 1935 |
| 2,474,401 | Mustee | June 28, 1949 |
| 2,633,108 | Sterick | Mar. 31, 1953 |

FOREIGN PATENTS

| | | |
|---|---|---|
| 846,888 | Great Britain | Aug. 9, 1956 |